(No Model.)
J. BALMORE.
STEAM TRAP.
No. 516,178. Patented Mar. 13, 1894.
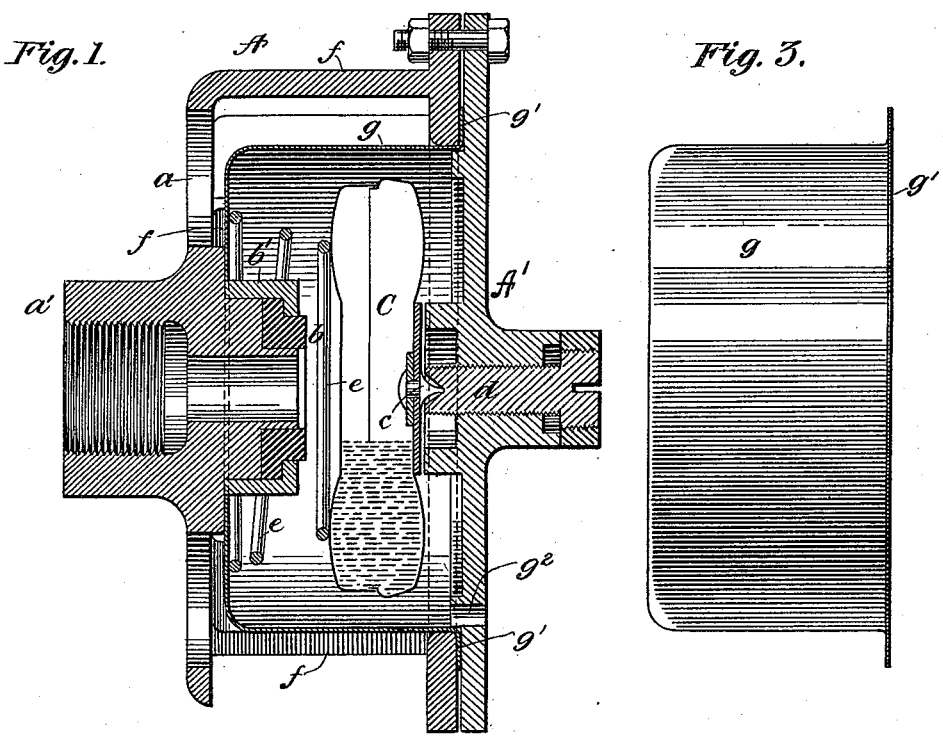
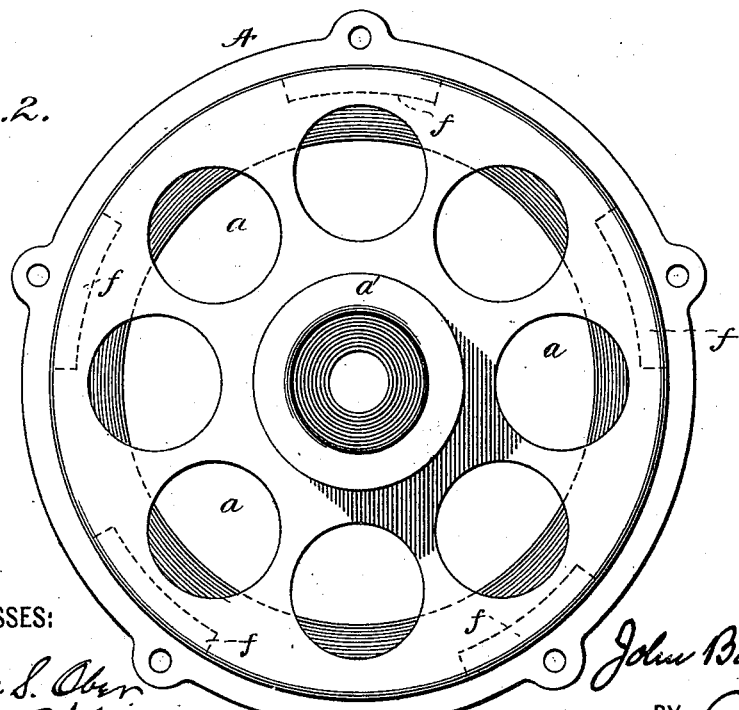
WITNESSES:
Frank S. Ober
W. A. Opperman
INVENTOR
John Balmore
BY
Rosenbaum
ATTORNEY

UNITED STATES PATENT OFFICE.

JOHN BALMORE, OF NEW YORK, N. Y.

STEAM-TRAP.

SPECIFICATION forming part of Letters Patent No. 516,178, dated March 13, 1894.

Application filed March 14, 1893. Serial No. 465,887. (No model.)

*To all whom it may concern:*

Be it known that I, JOHN BALMORE, a citizen of the United States, residing at New York, in the county of New York and State of New York, have invented certain new and useful Improvements in Steam-Traps, of which the following is a full, clear, and exact description.

This invention relates to steam traps especially adapted to the steam heating apparatus of railway cars, although not confined to such apparatus.

The object of the invention is to provide a trap in which the valve controlling the escape of the water of condensation or steam, is automatically operated by the temperature of the water or steam which comes in contact with it and in which this operation will be more sensitive than in other devices of a similar nature heretofore produced.

My invention is an improvement on a common form of trap, which is designed to render the latter more sensitive and quick in its operation.

The invention consists of the details hereinafter described and particularly pointed out in the claims.

In the accompanying drawings, Figure 1 represents a longitudinal section of my improved trap. Fig. 2 represents a plan of one end of the same; and Fig. 3 represents a side elevation of the particular device constituting my invention.

The trap consists of a casing A, one end of which, shown in Fig. 2, is provided with a number of openings $a$, or is otherwise constructed to admit air into the interior of the casing. The opposite end of the casing is closed by a cover A'. The end containing the openings $a$, is provided with a central boss $a'$, which is to be screwed upon the end of the steam pipe, and through this boss a passage for steam into the casing is made. At the inner end of the passage is fixed a suitable valve seat $b$, which is held in place by a sleeve $b'$. The valve itself consists of a hollow closed vessel C, made of thin material, and containing a quantity of alcohol or other highly volatile liquid. The side walls of the chamber are of comparatively large surface and formed so that they will yield to pressure exerted on either side. At the center of one side of the valve and on the outside thereof, is located a conical lug $c$ which normally rests in a conical depression or cavity in the end of a screw $d$. This screw is adjustably fixed in the center of the wall of the case opposite the steam passage, and is provided with a lock nut by which it may be held in any desired position. It forms a fixed abutment, preventing a movement of the valve under expansion in one direction, and causing that movement to be entirely in the opposite direction. The valve is normally held against this screw by a spiral spring $e$ surrounding the steam passage, as shown. The side walls $f$ of the case consist simply of straight bars connecting the two end walls of the casing together. The casing is, therefore, a skeleton frame through which the air has free circulation. The valve, steam port, and spring are all contained within a closed chamber formed by a cup $g$ of thin material. This cup is shown in detail in Fig. 3. In the bottom, it is provided with a central opening through which projects the end of the steam passage, and its outer edges are preferably provided with a flange $g'$ which is secured between the end and side walls of the casing, as shown in Fig. 1. That portion of the end wall between the sides of the chamber $g$, is continuous, except for a small perforation $g^2$ to permit the escape of liquid from the chamber. This chamber or vessel $g$ is preferably made of very thin copper, or other metal, so that the temperature of the surrounding atmosphere will be quickly communicated through it to the air inside of the chamber. Steam traps of this character heretofore used, have been made with a casing entirely closed and without the thin metal chamber $g$, and in such apparatus it requires considerable time for the atmosphere on the inside to be affected by that on the outside. It has been necessary also to use a thick, closed casing in order to properly protect the valve and mechanism contained within it. In my improved trap, the outer casing is made sufficiently heavy to protect the interior mechanism, but it is made in open or skeleton work to permit free circulation of air through all parts of it, and the thin metal vessel $g$ is only intended to afford such protection as is necessary to exclude dust and small foreign bodies from the valve and valve seat, and to confine the steam so that it will act upon the valve. The atmosphere, therefore, has free access to this vessel $g$, and it is thoroughly protected from external injury.

In the operation of the device, when steam is in the steam pipes, the heat thereof causes the volatile liquid to evaporate and exert a pressure within the valve which expands it toward, and closes the steam passage, thus preventing the escape of steam. As this trap, however, is located at the end of the steam coil, there will ordinarily be nothing but hot water presented at the valve opening, and and this will be sufficiently low in temperature to open the valve slightly for its own escape. As soon as the water has all escaped and the steam commences to pass out, the heat thereof closes the valve. The surrounding atmosphere acts quickly upon the air inside of the chamber $g$ through its thin walls and quickly causes the valve to contract as soon as the steam ceases to flow. This contraction again lets the water out. All the water which collects in the chamber $g$ passes out through the perforation $g^2$.

Having thus described my invention, I claim—

1. In a steam trap, a valve operating by expansion and contraction located in a chamber, the walls of which are exposed to the atmosphere, in combination with a protecting shield or guard, for the purpose set forth.

2. In a steam trap, a valve operating by expansion and contraction, located in a chamber, the walls of which are exposed to the atmosphere, in combination with a protecting shield or guard, the steam passage to the valve being formed in said shield.

3. In a steam trap, the vessel $g$ having flanges $g'$, in combination with a shield formed in two parts A and A', the flange of the vessel being clamped between the parts of the shield, and a valve located inside the vessel as described.

In testimony whereof I subscribe my signature in presence of two witnesses.

JOHN BALMORE.

Witnesses:
FRANK S. OBER,
W. A. OPPERMAN.